J. H. KEYS.
SPRINKLER.
APPLICATION FILED AUG. 21, 1912.

1,076,890.

Patented Oct. 28, 1913.

Witnesses
G. Howard Walmsley
Harriet L. Hammaker

Inventor
John H. Keys,
By Toulmin & Reed
Attorneys

COLUMBIA PLANOGRAPH CO., WASHINGTON, D. C.

UNITED STATES PATENT OFFICE.

JOHN H. KEYS, OF DAYTON, OHIO.

SPRINKLER.

1,076,890.  Specification of Letters Patent.  Patented Oct. 28, 1913.

Application filed August 21, 1912. Serial No. 716,132.

*To all whom it may concern:*

Be it known that I, JOHN H. KEYS, a citizen of the United States, residing at Dayton, in the county of Montgomery and State of Ohio, have invented certain new and useful Improvements in Sprinklers, of which the following is a specification, reference being had therein to the accompanying drawing.

This invention relates to sprinklers and is designed more particularly for use as a lawn sprinkler.

The object of the invention is two-fold: first, to distribute the water or other fluid over a large area, and, second, to distribute the water over areas of different sizes and shapes. To accomplish one or both of these objects it is a further object of the invention to provide a spreader arranged in the path of the water discharged from a nozzle and to cause the spreader to move in a path of the shape and length necessary to distribute the water over the desired area.

It is a further object of the invention to provide a spreader having both a rotary movement and a bodily movement, the former causing the latter.

In further carrying out the invention I provide two nozzles with a spreader arranged in the path of the water discharged from one nozzle, the other nozzle being arranged to distribute the water beyond the area covered by the spreader.

Figure 1:
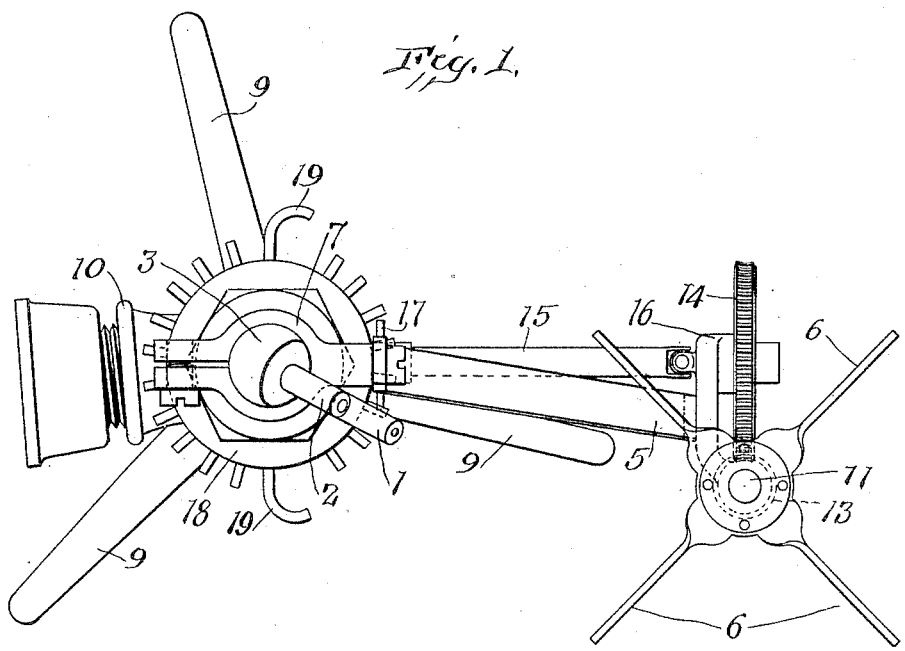
Figure 2:
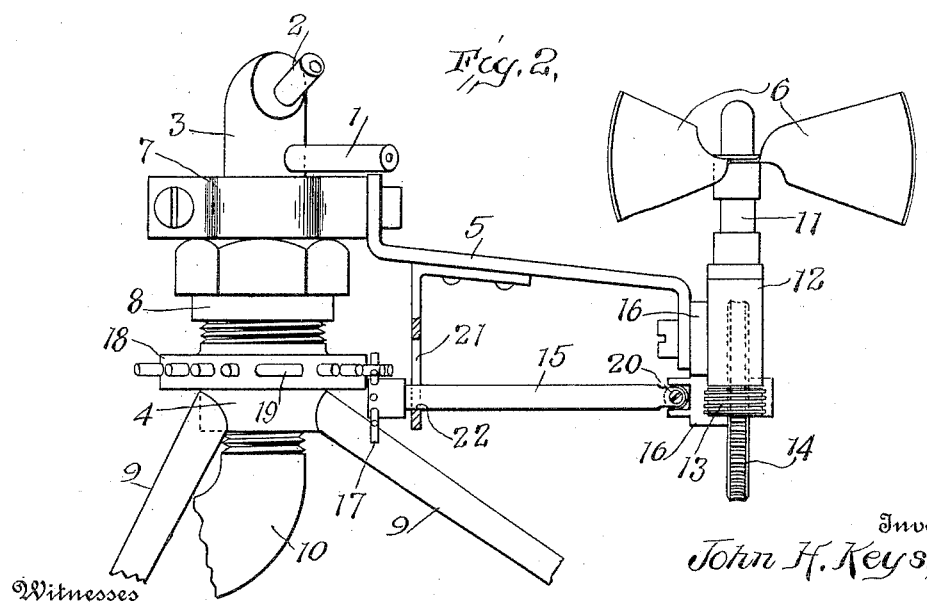

In the accompanying drawings, Figure 1 is a top, plan view of a sprinkler embodying my invention; and Fig. 2 is a side elevation of the same, partly broken away.

In these drawings I have illustrated one embodiment of my invention and have shown the same as comprising two nozzles indicated at 1 and 2, respectively, and both mounted on a movable support which, in the present form of the device, comprises a conduit 3 in the form of a hollow stud rotatably mounted in a base 4 and having secured thereto a laterally extending frame 5 on which is mounted a spreader 6 arranged in the path of the stream of fluid discharged from one of the nozzles, in the present instance, the lower nozzle 1. The frame 5 and the rotatable conduit 3, which constitute the support, may be connected in any suitable manner. As here shown, a collar 7 is mounted on the conduit 3 and the frame 5 is secured thereto. It will be understood, of course, that both the support and the base on which it is mounted may assume various forms, that here shown being merely for the purpose of illustrating the invention. The base comprises a hollow upper portion 8 in which the conduit 3 is mounted and has secured thereto suitable supporting members, such as the diverging legs 9, of which I have shown 3. Communicating with the lower end of the hollow upper portion of the base is an elbow 10, or any other suitable coupling, by means of which the hollow upper portion of the base and the rotatable conduit 3 may be connected with a suitable source of fluid supply, such, for example, as the ordinary garden hose.

The fluid discharged from the lower nozzle 1 impinges against the spreader 6 and is distributed over a large area. This area is preferably increased by making the distributer movable but maintaining it at all times within the path of the fluid from the nozzle 1. One of the most desirable movements for the distributer is bodily movement about the nozzle and the base on which it is supported and we have, therefore, illustrated a device in which the spreader has such a movement. It will be apparent that the frame and the spreader will revolve with the nozzle-carrying conduit 3 to which the frame is rigidly secured. The rigid connection between the frame and the conduit maintains the nozzle at all times in substantially the same relation to the spreader, but changes the direction in which the nozzle discharges the water, thus causing the spray formed by the spreader to be directed over different portions of the surface to be sprinkled. The bodily movement of the spreader about the axis of the conduit 3 may comprise only a portion of a complete revolution. If the area to be sprinkled is large the sprinkler may be placed in the center of it and by causing the spreader to travel through a complete revolution a very large area will be covered. If, however, the area is not so large, for example, it may be one side of a lawn which is much longer than it is broad, the sprinkler may be placed at one side of the surface which is to be sprinkled and by causing the spreader to travel through substantially a semicircle an oblong area will be covered by the sprinkler. In this connection it will be understood that it is not essential that the support for the nozzle and the spreader should travel in a circle or about a central axis but the character of the movement imparted to these members may be varied as may be desirable. Further, the movement may be secured in any suitable manner. Preferably, this is accomplished by utilizing the force of the fluid discharged from one of the nozzles. To this end the spreader is preferably movable relatively to its support, and, in the present instance, it is in the form of a fan-shaped structure comprising a plurality of blades mounted upon a vertical shaft 11 rotatably mounted in a bearing 12 at the outer end of the frame 5 which forms a part of the supporting structure. The position of the shaft relatively to the lower discharge nozzle 1 is such that the stream of fluid discharged from this nozzle will impinge successively against the blades 6 of the spreader as the shaft 11 rotates, thus causing the shaft 11 to rotate at a high speed and at the same time spreading or distributing the water over a large area. The rotary movement of the shaft 11 may be utilized to impart bodily movement to the support which carries the spreader. One very practical way of accomplishing this is to provide the lower end of the shaft 11 with a worm 13 which meshes with a worm wheel 14 secured to a shaft 15 journaled in a bearing 16 carried by the outer portion of the frame 5 and having at its inner end a pinion 17 adapted to travel over a rack 18 secured to the base. In the present form of the device this rack is either annular or segmental. As here shown it comprises a series of teeth adapted to be engaged by the teeth of the pinion 18, the teeth of both the pinion and the rack being in the nature of an elongated pin. The rotary movement imparted to the pinion will cause it to travel along the teeth of the rack, and, where the rack is annular in shape, to travel continuously about the same, thus causing the support to rotate about its axis. In the present device I have provided a complete annular rack but have so constructed the same that a portion of the teeth may be removed and the rack converted into a segmental rack. Further, by providing a suitable support for the pinion and reversing devices at each end of the rack the direction of movement of the support will be automatically reversed when it reaches either end of the rack. To accomplish this I remove two or three of the teeth from the rack 18 at such points as to leave between the spaces thus formed a segmental rack of the desiged length. I substitute in each space for one of the teeth removed a stop, which are here indicated at 19, adapted to engage a portion of the support and check its movement. The inner end of the shaft 15 carrying the pinion is capable of vertical movement and assuming that the pinion has been traveling along the lower side of the rack 18 when the support engages the stop 19 the pinion will climb up through the space at the end of the rack about the end tooth and will engage the upper sides of the teeth, thus causing the pinion and the support to travel back in the opposite direction. When the other end of the segmental rack is reached and the support again engages the stop the pinion will drop down and travel in the reverse direction along the lower side of the rack. To accomplish this the shaft 15 is preferably provided near the outer bearing 16 with a universal joint 20 and the inner end is supported by an arm 21 depending from the frame member 5 and having a vertical slot 22 through which the shaft extends and which serves to guide the pinion in its vertical movement. The arm 21 is arranged in a position to engage the stops 19 and constitutes that portion of the support which coöperates with these stops in reversing the movement of the support.

The upper nozzle 2 is arranged to discharge a stream of fluid beyond the area covered by the spreader 6, thus very materially increasing the area covered by the sprinkler. The operation of this second nozzle is the same regardless of the character of movement imparted to the spreader. It occupies always the same relation to the spreader and discharges its stream of fluid just beyond the area covered by the spreader. Both nozzles being supplied with water from a common source any variations of pressure will affect both and, consequently, the relative positions of the areas covered by the spreader and by the second nozzle will remain substantially the same.

While I have shown and described one embodiment of my invention it will be understood that this has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. A sprinkler comprising a rotatable support, a nozzle carried by said support and communicating with a source of fluid supply, and means actuated by the fluid discharged from said nozzle, whereby either a continuous rotary movement or an oscillatory movement may be imparted to said support.

2. A sprinkler comprising a rotatable support, a nozzle carried by said support and communicating with a source of fluid supply, and means actuated by the fluid discharged from said nozzle to impart a continuous rotary movement to said support, said means including removable elements the removal of which results in the conversion of said rotary movement into an oscillatory movement.

3. In a sprinkler, a base, a rack formed by pins mounted around said base, a part of said pins being removable, a nozzle rotatably mounted on said base and having connection with a source of fluid supply, a supporting arm carried by said base and connected with said nozzle, a spreader carried by the arm and arranged in the path of the fluid discharged from said nozzle, and a driving connection between the spreader and rack adapted when all of said pins are in place to continuously rotate the nozzle, arm and spreader, and adapted when certain of the pins are removed to impart an oscillatory movement to said parts.

4. A sprinkler comprising a support having movement about a vertical axis, a nozzle carried by said support, a spreader also carried by said support, having movement about a vertical axis and arranged in the path of the fluid discharged from said nozzle, a pinion mounted on said support and driven from said rotary spreader, a rack fixed with relation to the axis of said support and arranged to be engaged by said pinion, and means to reverse the direction of movement of said support at each end of said rack.

5. In a sprinkler, a base, a segmental rack carried thereby, a support mounted on said base and having movement about a vertical axis, a nozzle carried by said support, a spreader also carried by said support and having movement about a vertical axis, a pinion mounted on said support and having bodily movement relatively thereto, means for driving said pinion from said rotatable spreader, and means arranged at the opposite ends of said rack to cause said pinion to move from one side thereof to the other side thereof, thus reversing the direction of movement of said support.

6. In a sprinkler, a base, a rack mounted on said base and comprising a plurality of substantially horizontal teeth, a stop arranged at either end of said rack, a support mounted on said base and movable about a vertical axis, a nozzle carried by said support, a spreader mounted on said support to move about a vertical axis and arranged in the path of the fluid discharged from said nozzle, a shaft mounted on said support and operatively connected with said spreader, one end of said shaft being capable of vertical movement, and a pinion mounted on the movable end of said shaft and adapted to engage the teeth of said rack on either side thereof.

In testimony whereof, I affix my signature in presence of two witnesses.

JOHN H. KEYS.

Witnesses:
EDWARD L. REED,
HARRIET L. HAMMAKER.

Copies of this patent may be obtained for five cents each, by addressing the "Commissioner of Patents, Washington, D. C."